United States Patent
Suzuki et al.

(10) Patent No.: US 6,704,119 B1
(45) Date of Patent: Mar. 9, 2004

(54) FILE SYSTEM AND STORAGE MEDIUM STORING PROGRAM USED IN SUCH SYSTEM

(75) Inventors: Kiyoshi Suzuki, Tokyo (JP); Takashi Harada, Kanagawa (JP); Atsushi Hanai, Kanagawa (JP); Hiroshi Takahashi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/177,378

(22) Filed: Oct. 23, 1998

(30) Foreign Application Priority Data

Oct. 24, 1997 (JP) .............................................. 9-291451
Nov. 4, 1997 (JP) .............................................. 9-301364
Jul. 15, 1998 (JP) ............................................ 10-200902

(51) Int. Cl.⁷ .............................................. G06F 12/00
(52) U.S. Cl. ...................... 358/1.16; 358/1.9; 358/1.15; 358/468
(58) Field of Search .............................. 358/1.16, 1.14, 358/1.15, 468, 403, 1.9, 434

(56) References Cited

U.S. PATENT DOCUMENTS 6,424,429 B1   7/2002   Takahashi et al.

OTHER PUBLICATIONS

U.S. patent application Ser. No. 09/177,378, Suzuki et al., filed Oct. 23, 1998.
U.S. patent application Ser. No. 10/378,892, Takahashi et al., filed Mar. 5, 2003.

Primary Examiner—Edward Coles
Assistant Examiner—Tia Carter
(74) Attorney, Agent, or Firm—Oblon, Spivak, McClelland, Maier & Neustadt, P.C.

(57) ABSTRACT

A file system in which a processing apparatus is coupled to a storage unit includes a storage management system for automatically causing the storage unit to store data equal to processed data corresponding to a processing result obtained by the function provided in the processing apparatus, and an output management system for outputting the data read from the storage unit in response to a processing instruction supplied to the file system. The storage management system obtains specifying information specifying data to be stored by the storage unit so that the data to which the specifying information is added is stored by the storage unit. The the output management system has a display unit for displaying either at least a part of each of data items stored by the storage unit or specifying information items specifying the data items, and an operation unit for selecting an item from among the items displayed by the display unit and inputting the processing instruction, so that a data item corresponding to the selected item is output in response to the input processing instruction.

22 Claims, 12 Drawing Sheets

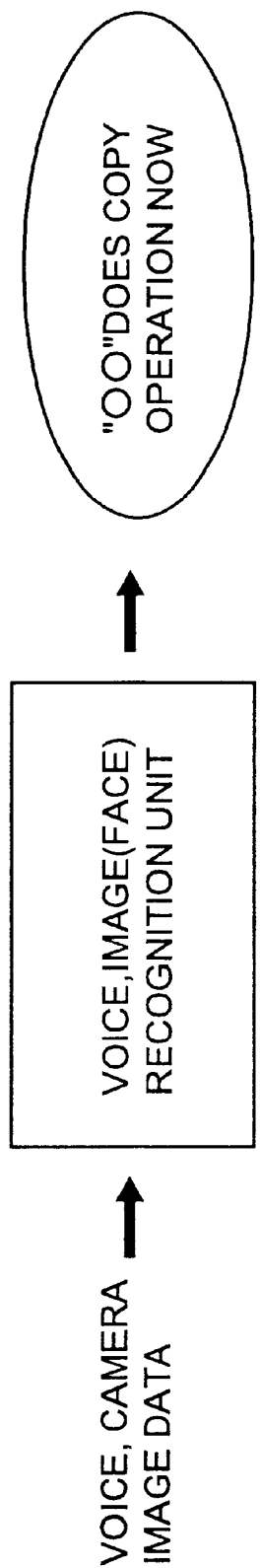

FILE SYSTEM AND STORAGE MEDIUM STORING PROGRAM USED IN SUCH SYSTEM

STATEMENT OF RELATED APPLICATIONS

The present application is related to the application Ser. No. 08/754,721, titled "AUTOMATIC AND TRANSPARENT DOCUMENT ARCHIVING", filed on Nov. 21, 1996. The contents of the application Ser. No. 08/754.721 are herein incorporated by reference.

BACKGROUND OF THE INVENTION

1. Field of the Invention

The present invention relates to a file system, and particularly to a file system, applicable to a data processing system for a copying process, a facsimile communication process, a printing process and/or like, in which processed data is automatically captured and desired data can be read out of the captured data and processed. Further, the present invention relates to a storage medium storing programs used in such a file system.

2. Description of the Related Art

Conventionally, important documents (including images and characters) which should be archived and documents which will be able to be used are filed as papers. However, in offices in which a large number of documents is archived, a large amount of space is needed to archive the documents and a large amount of time is needed to search the archived documents for a desired document.

Thus, in the recent years, with rapidity of data processing, development of data processing technology and cost reduction of memories, a file system in which data obtained by optically scanning documents to be archived is stored in a mass storage unit has been proposed. Such file systems starts to be used in various offices.

In such a filing system, document data items are systematically classified in accordance with types thereof in a database so that document data Items can be easily retrieved. To improve usability, various types of file systems are being developed.

However, in conventional file systems, it is necessary to read documents using a scanner in order to store the document data in the storage unit. That is, a user must operate the scanner in order to store the document data. If a user does not decide to file a document every time receiving the document, the document is piled on a desk. In a state where a large number of documents are piled up, it is troublesome for the user to operate the scanner to read the documents while classifying the documents. As a result, only a small number of documents is archived in the file system.

In addition, even If the document data items are systematically classified in the database, classes of documents must be determined to archive the documents and key words must be assigned to the documents to easily retrieve desired documents. Since operations for the above are troublesome, the operations may not be done, so that only the document data items are stored in the database, As a result, the file system is not profitably used.

Further, the user determines whether or not a received document is archived in the file system. The user can not have the document which was determined to not be archived in the file system and abandoned.

Thus, in a case where it is difficult to determine whether a document is archived in the file, a long time is required to archive the documents.

Further, in the conventional file system, image data obtained by scanning the document is stored. If a user needs a document, image data corresponding to the document is read out and various image processes are then applied to the read image data so that the document having the same images as the original are printed out. Since various image processes are applied to the read image data, the document having the same images as the original can not be rapidly obtained.

Meanwhile, the documents to be archived in the file system may be copied documents used in conferences, facsimile documents received and/or transmitted by facsimile machines and printed documents in workstations (WS) and personal computers (PC). That is, the documents to be archived in the file system are obtained by converting original data into electric signals at least once and a printing operation based on the electric signals.

SUMMARY OF THE INVENTION

Accordingly, a general object of the present invention is to provide a novel and useful file system in which the disadvantages of the aforementioned prior art are eliminated.

A specific object of the present invention is to provide a file system in which processed data can be easily used in response to a request.

Another object of the present invention is to provide a file system in which processed data can be automatically captured without a specific operation for capturing the processed data.

Further, another object of the present invention is to provide a file system in which desired data can be easily and rapidly retrieved.

The above objects of the present invention are achieved by a file system in which a processing apparatus is coupled to a storage unit, the processing apparatus having at least one of a copy function for reading image data and printing the read image data on a sheet, a transmitting function for transmitting image data and/or character data via a communication line and a printing function for printing received image data and/or character data on a sheet, the file system comprising: storage management means for automatically causing the storage unit to store data equal to processed data corresponding to a processing result obtained by the function provided in the processing apparatus; and output management means for outputting the data read from the storage unit in response to a processing instruction supplied to the file system, wherein the storage management means has information obtaining means for obtaining specifying information specifying data to be stored by the storage unit so that the data to which the specifying information is added is stored by the storage unit, and wherein the output management means has display means for displaying either at least a part of each of data items stored by the storage unit or specifying information items specifying the data items, and operation means for selecting an item from among the items displayed by the display means and inputting the processing instruction, so that a data item corresponding to the selected item is output in response to the input processing instruction. According to the present invention, when data is processed by the function provided in the processing apparatus, data equal to processed data corresponding to a processing result obtained by the function of the processing apparatus is automatically stored In the storage unit without a specific operation for storing the data. Specifying information specifying the data to be stored in the storage unit is added to the data. The data items stored in the storage unit can be reused by selecting corresponding specifying information items or parts of data items which are displayed by the display unit.

The data processed in the processing apparatus can be automatically backed up in the file system and easily reused.

The above objects of the present invention are also achieved by a file system in which a processing apparatus is coupled to a storage unit, the processing apparatus having at least one of a copy function for reading image data and printing the read image data on a sheet, a transmitting function for transmitting image data and/or character data via a communication line and a printing function for printing received image data and/or character data on a sheet, the file system comprising: storage management means for causing the storage unit to store data equal to processed data corresponding to a processing result obtained by processing data in accordance with the function provided in the processing apparatus; and output management means for outputting data read out from the storage unit in response to a processing instruction, wherein the storage management means captures processed data obtained before printing in the copy function or the printing function and causing the storage unit to store the captured data, and wherein the output management means applies the data read out from the storage unit to the function which was used to process the data in the processing apparatus. According to the present invention, processed data obtained before printing in the copy function or the printing function is captured and stored in the storage unit. Since the processed data before printing is stored in the storage unit, the processed data read out from the storage unit can be rapidly printed out. Thus, the data backed up in the file system can be rapidly reused.

BRIEF DESCRIPTION OF THE DRAWINGS

Other objects, features and advantages of the present invention will be apparent from the following description when read in conjunction with the accompanying drawings, in which:

FIG. 9 is a diagram illustrating an example of means for recognizing an operator;

DESCRIPTION OF THE PREFERRED EMBODIMENTS

A description will be given, with reference to FIGS. 1–5, of a first embodiment of the present invention.

Figure 1:
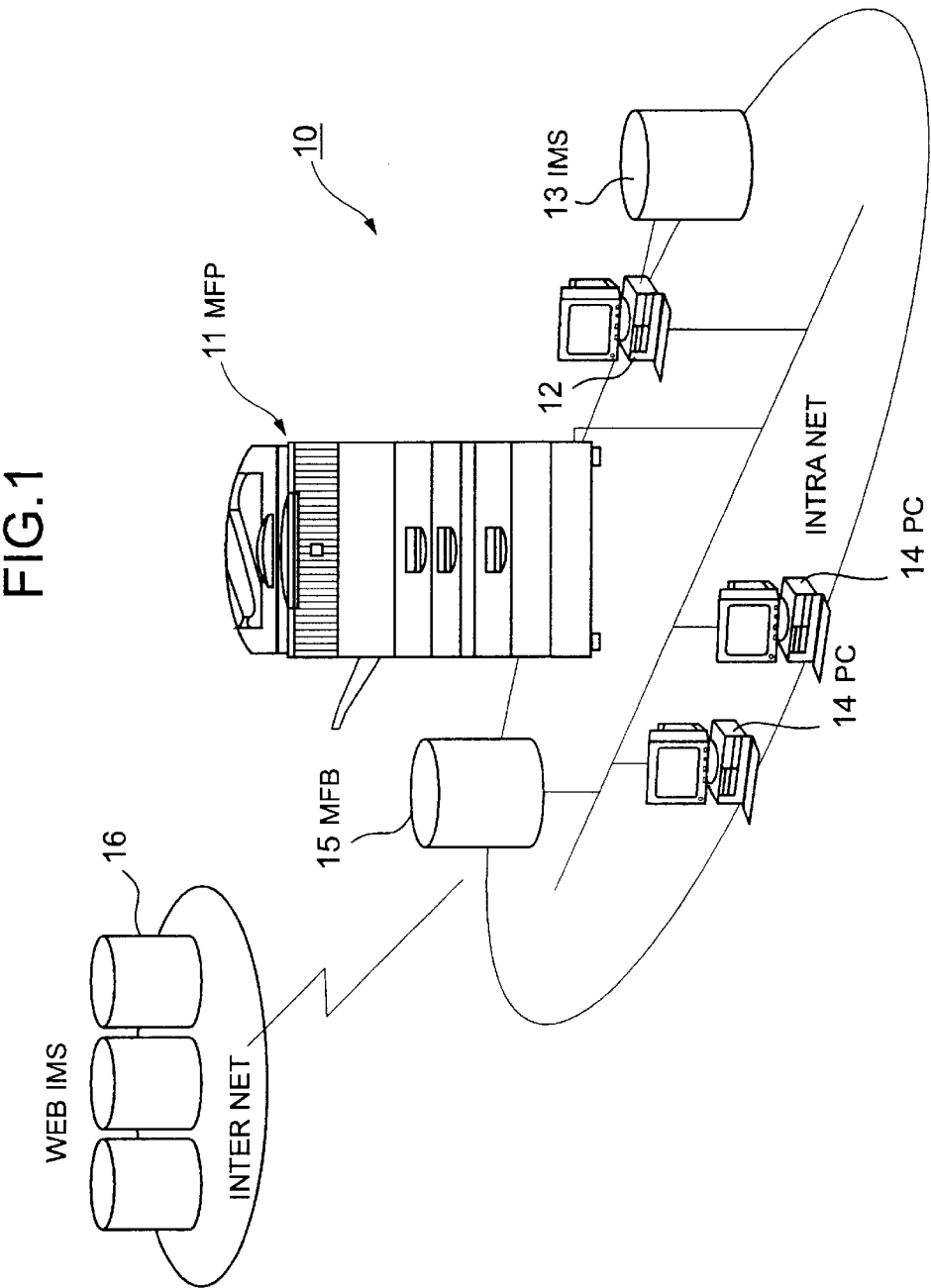
FIG. 1 is a diagram illustrating a system to which a file system according to a first embodiment of the present invention is applied.

Referring to FIG. 1, a data management system 10 has a multi-function peripheral (MFP) 11, a server 12, an infinite memory service (IMS) unit 13 (a mass storage unit), personal computers (PCs) 14 and a multi-function box (MFB) 15. An intranet interconnects the MFP 11, the server 11, the IMS unit 13, the PCs 14 and the MFB 15. The data management system 10 is connected to a Web-infinite memory service (Web-IMS) unit 16 in a service supplier via the internet. The data management system has a data-backup function for storing data used by a user and a file system function activated in accordance with a request from a user so that stored data can be reused.

Figure 2:
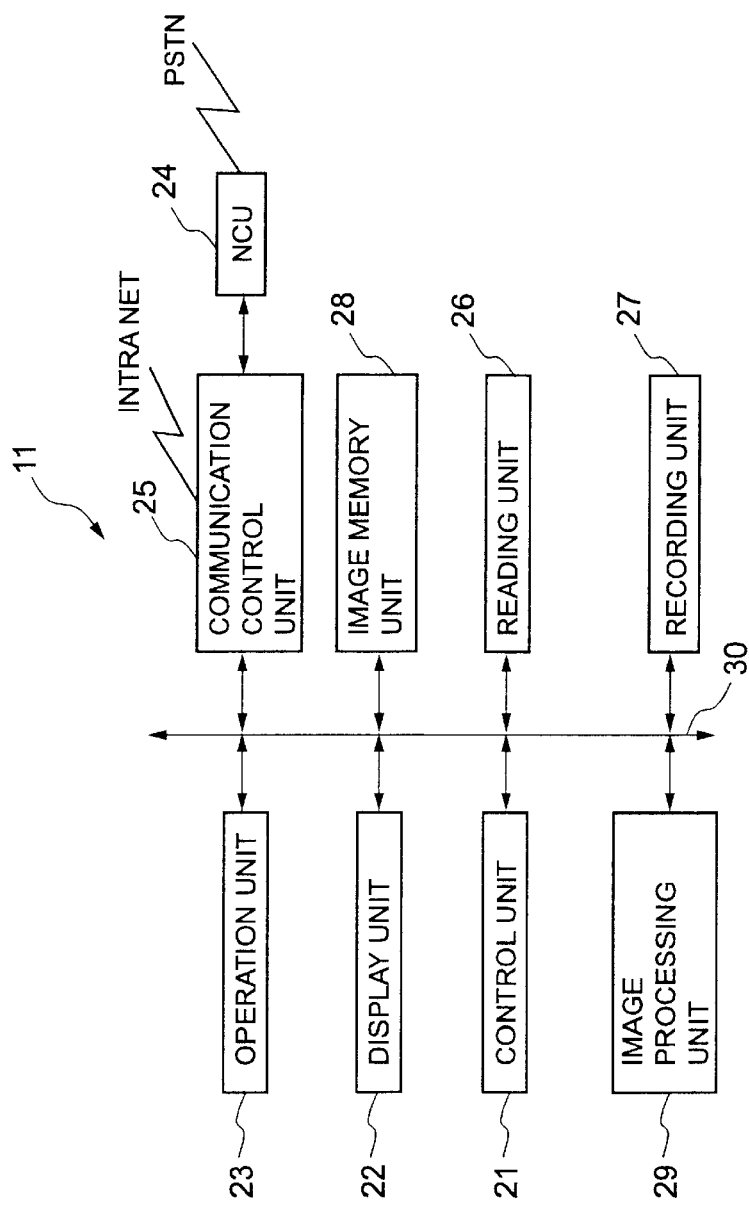
FIG. 2 is a block diagram illustrating a processing apparatus in the file system.

The MFP 11 has, as shown in FIG. 2, a control unit 21, a display unit 22, an operation unit 23, a network control unit (NCU) 24, a communication control unit 25, a reading unit 26, a recording unit 27, an image memory unit 28 and an image processing unit 29 all of which are interconnected by a bus 30. The control unit 21 controls the respective units. In the control unit 21, a CPU (Central Processing Unit) executes various processes corresponding to functions which will be described later, using a RAM (Random Access Memory), in accordance with control programs read out from a ROM (Read Only Memory). The RAM stores various types of information, such as information about driving conditions of the respective units, management data and data used for operations.

Figure 3:
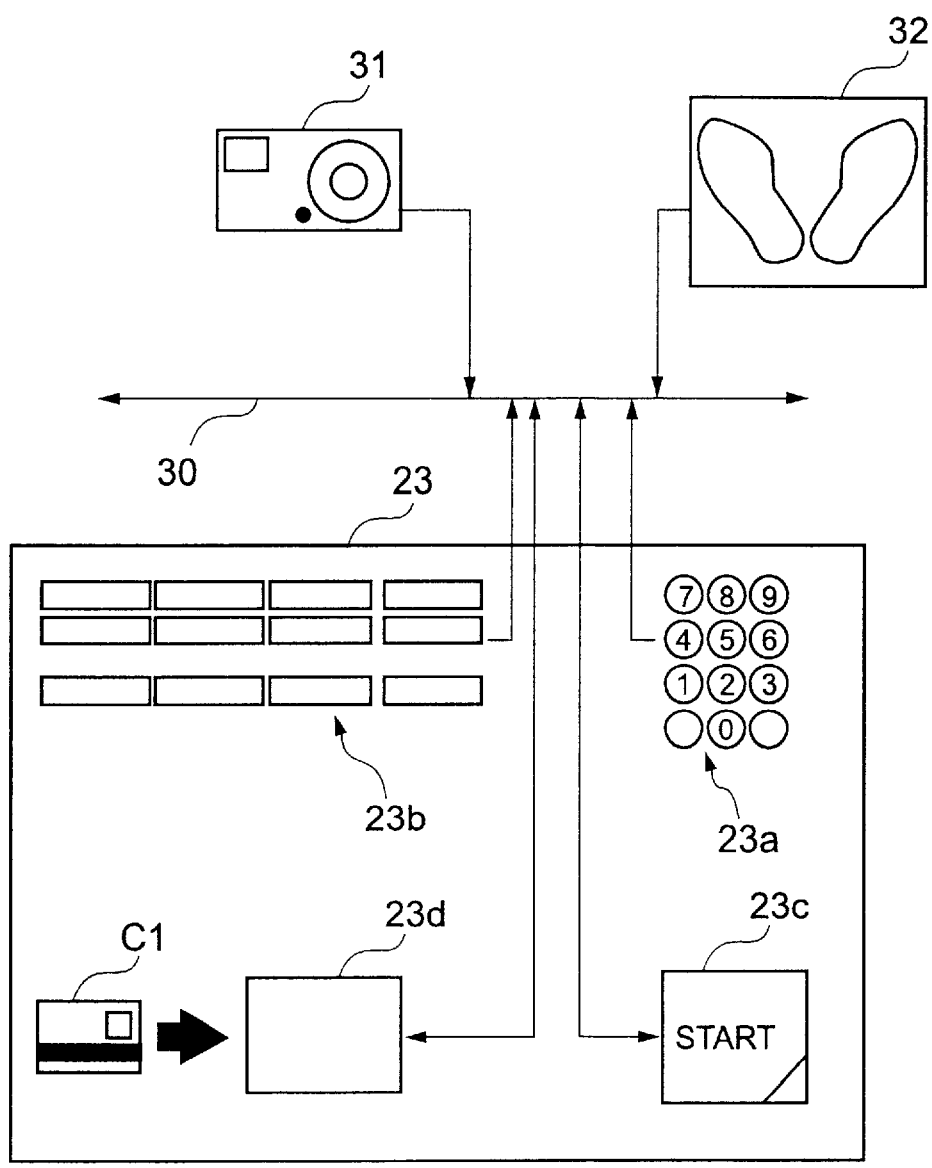
FIG. 3 is a block diagram illustrating an operation unit of the MFP unit in the filing unit shown in FIG. 1.

The display unit 22 displays various types of information, such as information about driving conditions and states of the respective units and input information. The operation unit 23 is provided, as shown in FIG. 3, a port on which ten-keys 23a, function keys 23b and a start key 23c are arranged and a slot 23d used to set an ID card C1. The user uses the ten-keys 23a and the function keys 23b to input instructions and other kinds of information. Various kinds of data, such as a user name and other attributes, (which will be explained later) is written into and read out from the ID card C1 set in the slot 23d. The NCU unit 24 is connected to a PSTN (Public Switched Telephone Network) and carries out a predetermined network control for network connection and disconnection when calling and being called. The communication control unit 25 carries out a facsimile communication process. In the facsimile communication process, a modem unit provided in the communication control unit 25 carries out modulation and demodulation of image data and protocol signals, and the modulated and demodulated image data and protocol signals are transmitted and received via the NCU unit 24. The communication control unit 25 is connected to the intranet via an interface (I/F) unit (not shown) and carries out a data communication process (transmission and reception) for document data, such as image data and character data. The reading unit 26 reads original images to be transmitted and copied and generates image data corresponding to the original image. The recording unit 27 operates in accordance with a so-called electrophotographic recording process. In the electrophotographic recording process, an electrostatic latent image is formed on a photosensitive drum 27a (see FIG. 12) based on the read and received Image data and the electrostatic latent image is developed using toner. The toner image is then transferred from the photosensitive drum 27a to a paper P and fixed thereon. The paper P on which the toner image is fixed is output as a recording result. The image memory unit 28 stores the read and received image data. The image processing unit 29 functions as a DCR (coding/decoding) and carries out an image correction process, an image change process and an image optimization process in accordance with requests. In the DCR, image data to be transmitted is compressed and coded and received image data is expanded and decoded. In the image correction process, image data is corrected in accordance with an optical response characteristic of the reading unit 26 and characteristic variation of a sensor. In the image change process, a magnification/reduction process for image data and a conversion process for converting character data (code data) into image data which is mapped on the image memory unit 28. In the image optimization process, image data is processed so as to fit to a writing characteristic of the recording unit 27. The recording unit 27 may operate in accordance with an ink-jet recording process, a thermal recording process or an impact recording process other than the electrophotografic recording process.

The MFP 11 formed as described above has a transmission function for the facsimile communication and the data communication, a copy function for outputting read image data and a recording function for recording received document data. That is, the MFP 11 can be used as a copy machine, a facsimile machine, a printer and a scanner. In the ID card C1 set in the operation unit 23 of the MFP 11, destination telephone numbers for the facsimile communication, addresses of the PCs 14 and/or processing conditions, such as magnification/reduction ratio in a copy operation, and a user ID are recorded. When the start key 230 is depressed after the function key 23b is operated (it is not necessary to operate the function key 23b in the copy operation), the processing conditions are read out from the IC card C1. Thus, various functions can be easily executed. In addition, the user ID is read out from the IC card C1 (when the PC 14 controls the MFP 11, document data is supplied along with the user ID from the PC 14), and management information, such as used functions and a number of papers used to record data, is then stored so as to correspond to the user ID in the RAM of the control unit 21. The management information may be used, for example, for accounting. When the document data is processed using a function of the MFP 11 in response to a processing instruction (a processing instruction from the user, a processing instruction from the PC 14 or a print-out instruction for received document data) and the processed document data is transmitted to the server 12, the user ID is added to the processed document data as additional data (specifying information). When the IC card C1 is not set in the MFP 11, the document data is processed as shared document data. In this case, a shared user ID is read out from a nonvolatile RAM and management information is stored so as to correspond to the shared user ID. In the accounting, the management Information corresponding to the shared user ID is used to account for common expenses.

The MFB 15 functions as a network hub for terminals, such as the MFP 11, the server 12 and the PCs 14 and relays data communication so that local area network (LAN) is formed. The management system 10 is connected to the internet via the MFB 15, so that the MFP 11, the server 12 and the PCs 14 can access the service supplier and use various kinds of data from the data supplier.

Each of the PCs 14 has a CPU, a memory unit (including a ROM and a RAM) and an input-output (I/O) circuit. The user operates a keyboard and a mouse while watching a display unit. In response to the operations of the keyboard and the mouse, operating processes are carried out in accordance with an application program read out from a hard disk unit (a storage medium) so that documents and images are edited. The document data is transmitted from the PC 14 to the MFP 11 along with the user ID and a processing instruction. Using the functions of the MFP 11, the document data is printed out and transmitted to a destination in the facsimile communication. Each of the PCs 14 can receive image data received by the MFP 11 in the facsimile communication and receive image data read by the MFP 11.

I addition, the Web-IMS unit 16 is connected to the internet via a communication system (not shown) of the service supplier. In the communication system, a CPU controls the Web-IMS unit 16 in accordance with control programs read out from a storage medium so that read and write operations of the Web-IMS unit 16 can be executed in response to accesses from registered users. When a storage instruction for back-up of the data is supplied, document data (stored in the IMS 13) and corresponding specifying (additional) data are transferred to and stored in the Web-IMS unit 16. When a reference instruction for stored document data is supplied from a registered user, the document data is read out from the Web-IMS unit 16 and transmitted in accordance with the reference instruction. When a transmission instruction for document data whose address is specified by additional data in the server 12 is supplied, the document data in the specified address is read out from the Web-IMS unit 16 and transmitted.

Figure 4:
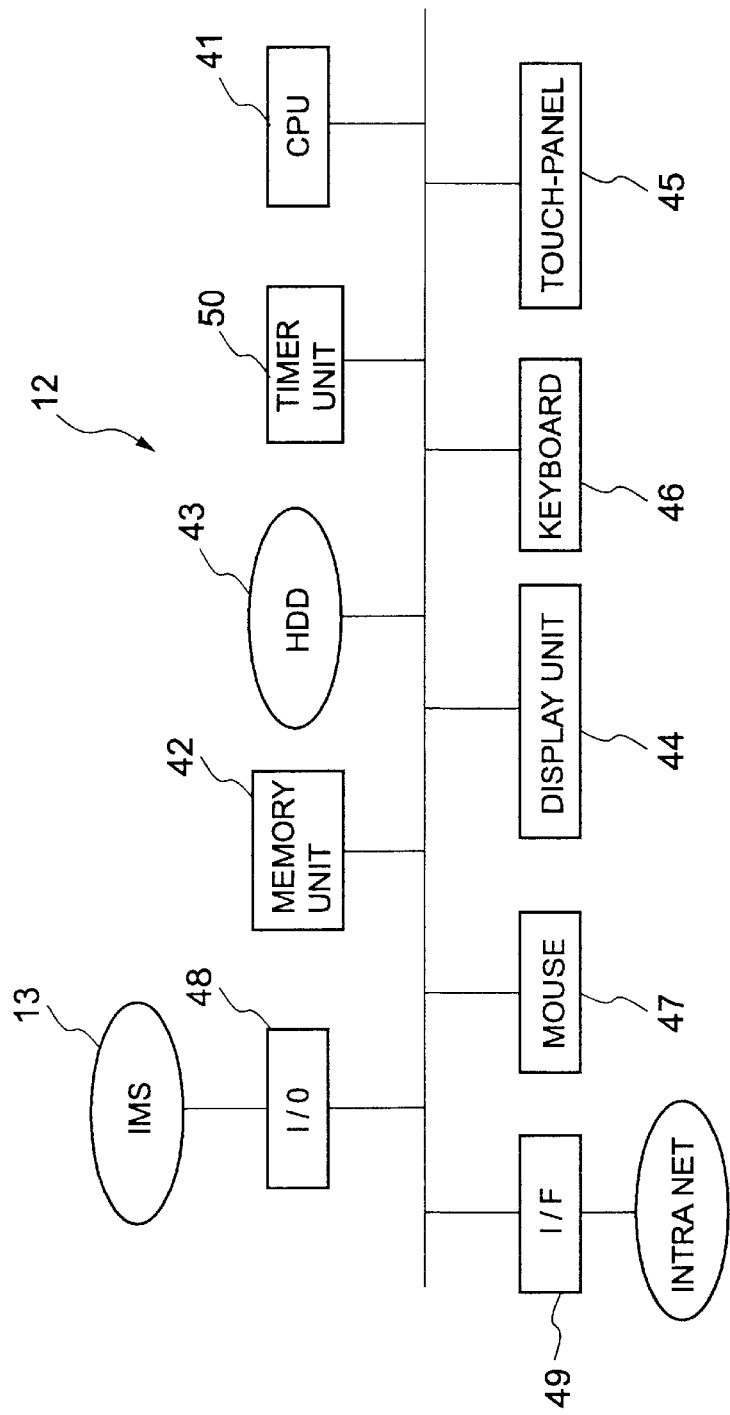
FIG. 4 is a block diagram illustrating a server in the filing unit shown in FIG. 1.

The server 12 has, as shown in FIG. 4, a CPU 41, a memory unit 42 (including a ROM and a RAM), a hard disk unit (a storage medium) 43, a display unit 44, a touch-panel 45, a keyboard 46, a mouse 47, an I/O circuit 48, a network I/P 49 and a timer unit 50. A personal computer may be used as the server 12. The CPU 41 controls the respective parts 42 through 49 in accordance with application programs read out from the hard disk unit 43 so that various processes are executed. The server 12 is connected with the IMS unit 13 via the I/O circuit 48. The network I/F 49 is connected with an Ethernet cable to form the intranet. To have a back-up service from the service supplier, data needed for connection to the internet, such as an address of the service supplier, a registered ID which is a user ID used to have services and may be equal to the user ID stored in the IC card C1 to be set in the MFP 11 and a password, is stored in the nonvolatile RAM of the memory unit 42.

The server 12 receives data processed in the MFP 11 via the intranet. The received data is transmitted to and stored in the IMS unit 13. In this case, a used capacity (storing capacity) of the IMS unit 13 is checked. If the used capacity exceeds a predetermined capacity, the service supplier is accessed using the address, the registered ID and the password in the memory unit 43. Data having a predetermined capacity is then read out from the IMS unit 13 in a sequence of storing date and transmitted to the Web-IMS unit 13 via the internet. In addition, in the server 12, a part of the document data (e.g., a thumb-nail image of a front page) and/or the additional data from the IMS unit 13 are read out in response to a request from the user and selectively displayed by the display unit 44. The server 12 reads out selected document data from the IMS unit 13 and transmits the document data to the MFP 11. The MFP 11 then output prints based on the received document data. Thus, the server 12 functions a part of the file system. In a case where the document data transmitted from the IMS unit 13 to and stored in the Web-IMS unit 16 is request for reference, the service supplier is accessed via the internet using the address, the registered ID and the password stored in the memory unit 42.

Figure 5:
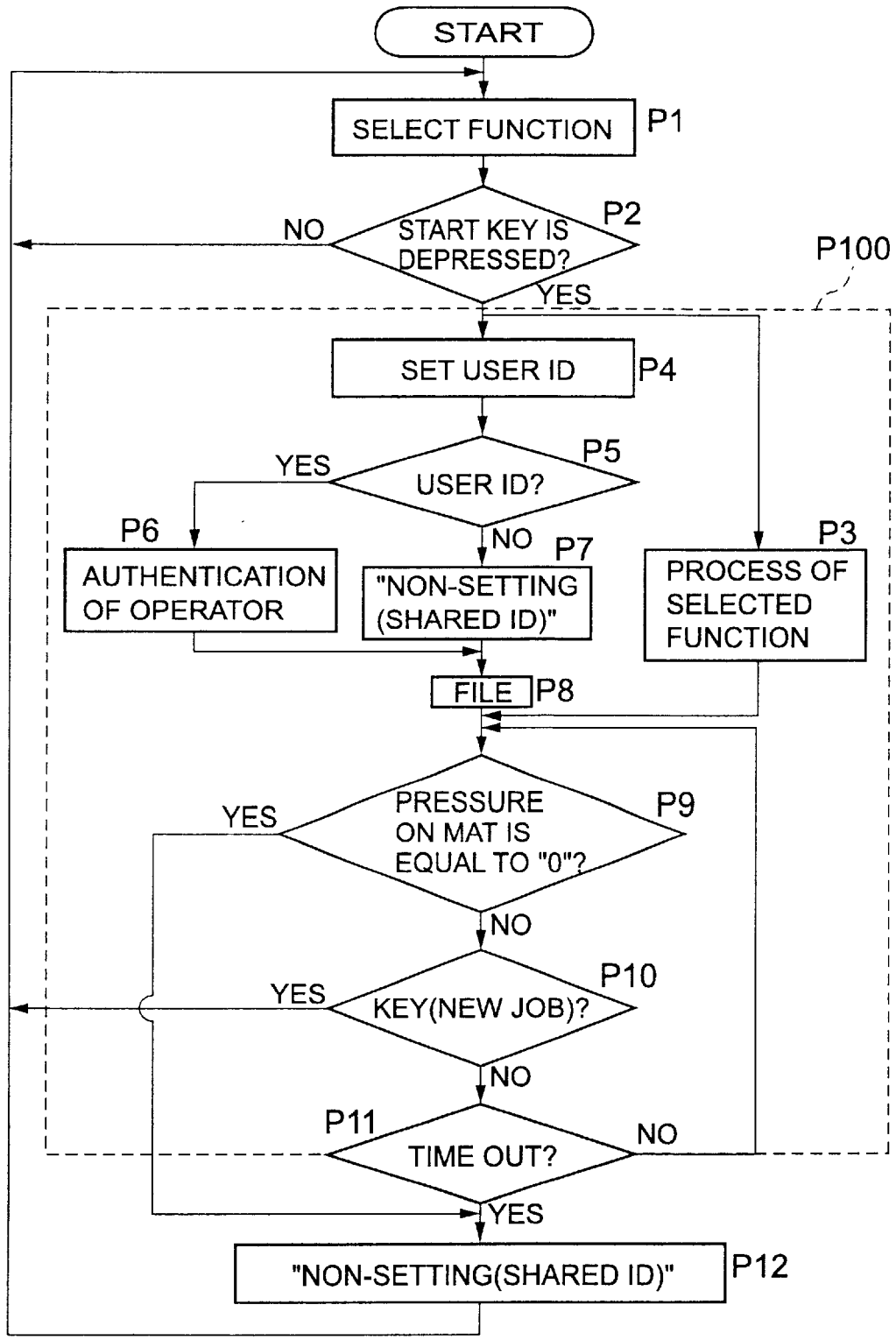
FIG. 5 is a flowchart illustrating an example of a procedure of a process executed by the MFP unit.

The MFP 11 operates in accordance with a procedure as shown in FIG. 5. Referring to FIG. 5, a selected function is confirmed (step P1). The MFP 11 is usually in a state where a copy function is selected. Another function, such as a facsimile function, is selected by operation of the function key 23b on the operation unit 23. It is then determined whether the start key 23c is depressed (step P2). When it is determined that the start key 23c is depressed, the MFP 11 operates in accordance with the selected function (step P3). If the function key 23b is not depressed so that the copy function is selected, document data obtained by the reading unit 26 reading an image of an original set thereon is printed out by the recording unit 27. If the function key 23b is depressed so that the facsimile function is selected, the document data obtained by the reading unit 26 is transmitted by the communication unit 25 in the facsimile communication. While the above process in step 3 is being executed, the following steps are executed. If the IC card C1 is set In the operation unit 23, the user ID is read out from the IC card C1 and set in an Internal register (P4). After this, when it is determined that the user ID is set (step P5), an operator is authenticated based on the user ID (step P6). On the other hand, when the IC card C1 is not set in the operation unit 23 and it is thus determined that the user ID is not set (steps P4 and P5), the shared ID is set as the user ID. In this case, the authentication of the operator is in a "non-setting" state (the shared ID) (step P7). A filing process is then executed (step P8) while the process based on the selected function is being executed. In the filing process, the document data equal to that obtained in the process based on the selected function is compressed and coded by the image processing unit 29. The user ID (the shared ID when the authentication of the operator is in the "non-setting state"), processed time information indicated by a timer unit (not shown) as a time at which the process is executed and the processing condition (e.g., the magnification/reduction ratio) are set as the additional data. The additional data and another type of additional data which will be described later are added to the document data. The document data to which the additional data is added is transmitted to the server 12 and stored (filed) in the IMS unit 13.

Thus, the document data equal to that obtained in the selected function of the MFP 11 is automatically stored without inputting a specific operation (or instruction) for filing the document data. The additional data specifying the document data is added to the document data. Even if the user ID is not set, the user ID is not required. In this case, the shared ID is used as the user ID and the document data is stored. The processed time information included in the additional data is obtained by the timer unit of the server 12 in the above example. However, time information from the MFP 11 in which the process based on the selected function is executed may be used as the processed time.

The other type of additional data to be added to the document data is obtained as follows.

As shown in FIG. 3, a digital camera 31 used to take a picture of the operator is connected to the bus 30. When the start key 230 is depressed, the control unit 21 causes the digital camera 31 to take a picture In an area including an operation position for the operator. Operator information corresponding to the picture taken by the digital camera 31 is edited as the additional data (operator information). In addition, in the MFP 11, a pressure detecting mat 32 is connected to the bus 30. The pressure detecting mat 32 is placed at the operation position and detects a pressure corresponding to a weight of the operator standing on the pressure detecting mat 32. It Is determined, based on the detecting result in the pressure detecting mat 32, whether the operator has left the operation position (step P9). Further, it is determined whether the key operation for another job is carried out (step P10). If it is determined, step P9, that the operator has left the operation position, the control unit 21 recognizes that the process based on the selected function is completed. The authentication of the operator is set in the "non-setting" state as the default condition (step P12). Due to setting such a default condition, the user ID is prevented from being used for an operation by another operator. When the key operation, such as operations of function key 23b and the start key 23c, for another job is carried out, the user ID is maintained and the process returns to step P1. In addition, it is determined whether a time counted by a timer unit reaches a predetermined time (step P11). If the time counted by the timer unit reaches the predetermined time in a state where it is not determined that the operator has left the operation position and the key operation for another job is carried out, the authentication of;the operator is set in the "non-setting" state as the default condition (step P12).

According to the above process, a picture data of the operator and a background is added to the document data. In addition, the user ID accurately corresponding to the operator is also added to the document data.

If an "undo" key (not shown) on the operation unit 23 is operated while the above steps P2–P11 are being executed, an instruction for avoiding storing the document data is generated (step 100). At this time, the steps for the back-up of the document data are skipped so that only the process based on the selected function is carried out. As a result, the back-up of the document data is not completed. That is, when the "undo" key is operated after the process, in step P8, for filing the document data starts, the additional data of the filed document data is deleted so that the filed document data can not be read out and the filed document data is then deleted before the process in response to the next instruction starts.

Thus, in the MFP 11, when only the operation for executing the process based on the selected function is carried out, the process (step P3) based on the selected function and the process (steps P4–P11) for the back-up of the document data are simultaneously executed. In addition, by only the operation of the "undo" key, for example, in a case where a document having a high secrecy is copied, the back-up of the document data is canceled. Thus, the document having a high secrecy can be prevented from being restored.

In addition, in the server 12, the CPU 41 receives the additional data specifying the document data and add the additional data to the document data. Additional remark (specifying) information, such as title information, added to document data supplied from the PC 14 may be used as the additional data. An OCR (Optical Character Reader) scans a document and character images on the document are converted into character code data. A key word repeatedly used in the document is detected based on the code data obtained by the OCR. The number of times which document data repeatedly is reused is counted. The key word and the counted number of times may be also used as the additional (specifying) data to be added to the document data.

Document data (the archived document data) stored in the IMS unit 13 and the Web-IMS unit 16 can be easily specified by the additional data.

The server 12 has a database of additional data in the hard disk unit 43 to easily retrieve document data stored in the IMS unit 13 and the Web-IMS unit 16. In the database, an address at which a document data item is stored in the IMS unit 13 or Web-IMS unit 16 and additional data items added to the document data item are stored in an area prepared for a corresponding user ID. Thus, in the server 12, when the user inputs a user ID and requests a reference of a document data item, the CPU 41 causes the display unit 44, in accordance with a reference instruction, to display a list of additional data items added to document data items specified by the input user ID. In addition, thumb nail images of the document data items read out from the IMS unit 13 or the Web-IMS unit 16 are displayed by the display unit 44. When the user inputs an additional data item and requests a reference (retrieval) of a shared document data item, the CPU 41 causes the display unit 41, in accordance with the reference instruction, to display a list of other additional data items added to the shared document data items identified by the input additional data under a selectable condition. In addition, thumb nail images of the shared document data items read out from the IMS unit 13 or the Web-IMS unit 16 are displayed by the display unit 44 under the selectable condition. A desired document data item can be selected by operations for pointing a corresponding additional data item in the list or a corresponding thumb nail image using the keyboard 46, the mouse 46 and/or the touch panel 46. In the server, when the user inputs a term to retrieve document data items having time information within the input term as the additional data, the reference process for only document data items which were stored in the input term is executed.

Further, in the server 12, information specifying a user, such as a thumb nail image of a user's face, a name, or a nickname, is registered, so as to correspond to a user ID specifying the user, in the hard disk unit 43. An address for the information specifying the user corresponds to the user ID in the database. The above information specifying a user, such as the thumb nail image of a user's face, is displayed by the display unit 44 and can be used to select a document data item instead of the input of the user ID.

In the sever terminal 12, a menu item for the reference of a document data item processed by the MFP 11 is selected on a display screen to reuse the document data item. In this case, when a user ID is input, or a thumb nail image of a face is selected, additional data items added to a document data items specified by the user ID are read out from the hard disk unit 43 and arranged in sequence of time as a list on the display screen. Thus, the document data items can be easily selected and read out from the IMS unit 13. The decoded document data item may be displayed by the display unit 44 after decoded by the image processing unit 29. In addition, the document data items may be transmitted to the MFP 11 together with a processing condition including the additional data to print documents based on the document data items. If a request for a document data item older than the document data items stored in the IMS unit 13 is input to the server 12, the address of the service supplier, the registered ID corresponding to the user ID and the password are read out from the nonvolatile RAM. The server 12 then accesses the service supplier in the internet using the above address, the registered ID and the password. A reference instruction for a document data item is transmitted to the service supplier. The reference process for the document data item is then carried out.

Thus, a desired document data item can be easily selected from among the document data items stored in the IMS unit 13 and the Web-IMS unit 16 using additional data items. By using time information indicating a time at which a document data item was processed, document data items processed in a term can be rapidly retrieved.

In addition, as to the shared document data item which was processed without input of a user ID, under a condition in which a user ID is used in the MFP 11, the shared ID stored in the MFP 11 is used as the user ID for reference of the shared document data. As a result, the shared data item can be processed in the same manner as the document data item specified by a user ID. In this case, a picture (a thumb nail image) of a user, standing on the operation area, taken by the digital camera 31 is displayed as the additional data by the display unit 44, so that the user who operated the MFP 11 to obtain the document data can be confirmed by the picture. In addition, when the document data stored in the IMS unit 13 and the Web-IMS unit 16 is printed out, a reference number, time information which are stored, for the document data, in the database formed in the hard disk unit 43 or a name of a user identified by the user ID may be added to a header portion of the printed document. In the above example, the picture of the user standing on the operation area taken by the digital camera 31 is used to confirm the user operating the MFP 11 to process the document data identified by the shared ID. However, even if a user ID (not the shared ID) is input by a user, the picture of the user standing on the operation may be displayed by the display unit 44 to use the picture to specify the document data.

In the system according to the present embodiment, document data which is the same as that processed by the MFP 11 can be automatically stored and maintained in the IMS unit 13 without specific operations for storing the document data. In this case, a user is authenticated using a user ID read out from the IC card C1 (the authentication of the user is set in the "non-setting" state when a user ID is not input). If the IMS unit 13 overflows with document data, document data can be stored in the Web-IMS unit 13 of the service supplier in the internet. Thus, the user can operates the MFP 11 without caring for overflow of the storage unit (the IMS unit 13).

If a user needs a document data item, the user inputs a reference instruction to the server 12. In this case, document data items specified by additional data items selected from the list displayed on the display screen are transmitted from the IMS unit 13 or the Web-IMS unit 16. The document data items are then printed out by the MFP 11 so that the document data can be reused.

Time information indicating a time at which a document data was processed, key words in the document, additional remark information added to the document data, the number of times which the document data has been repeatedly reused (the number of times which the document data is output) and/or a picture of the operator are added to the document data. Thus, even if the user does not accurately remember a document, the document data can be retrieved using date at which the document was processed, key words and/or other kinds of additional data. A document data which was processed by the MFP 11 without inputting a user ID can be specified by a thumb nail image of a user who operates the MFP 11 to process the document data.

Thus, document data items processed by the MFP 11 can be automatically archived in the file system. The document data items can be reprinted by the MFP to be reused.

In addition, when the "undo" key is depressed, the archive of the document data is canceled (the document data can not be read out). Thus, data which should not be archived and document data having the high secrecy are avoided from being archived in the file system.

Figure 6:
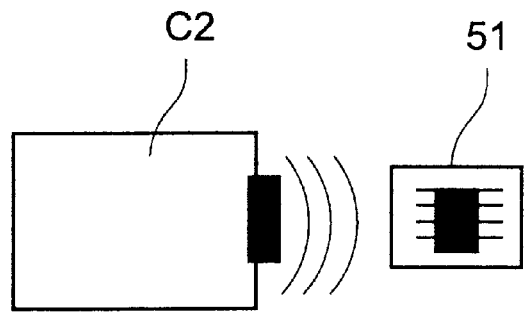
FIG. 6 is a diagram illustrating an essential part of a first modification.

A portable information transmission card C2 as shown in FIG. 6 is substituted for the ID card C1 (in a first modification). In this case, information, such as a user ID, is transmitted from the portable information transmission card C2 to a receiver 51. Thus, an operation for inserting the ID card C1 into the slot 23d can be omitted. In addition, the MFP 11 may be provided with a fingerprint recognition unit (not show). In this case, a fingerprint of a user can be used as a user ID. Further, a user ID may be registered in the MFP 11 sodas to correspond to one of the function keys 23b. In this case, when one of the function key 23b is depressed, a corresponding to user ID is specified. Further, the depressing operation of one of the function keys 23b corresponding to a user ID may be substituted for the depressing operation of the start key 23c. In addition, a user ID may be input by operations of the ten keys 23a.

Figure 7:
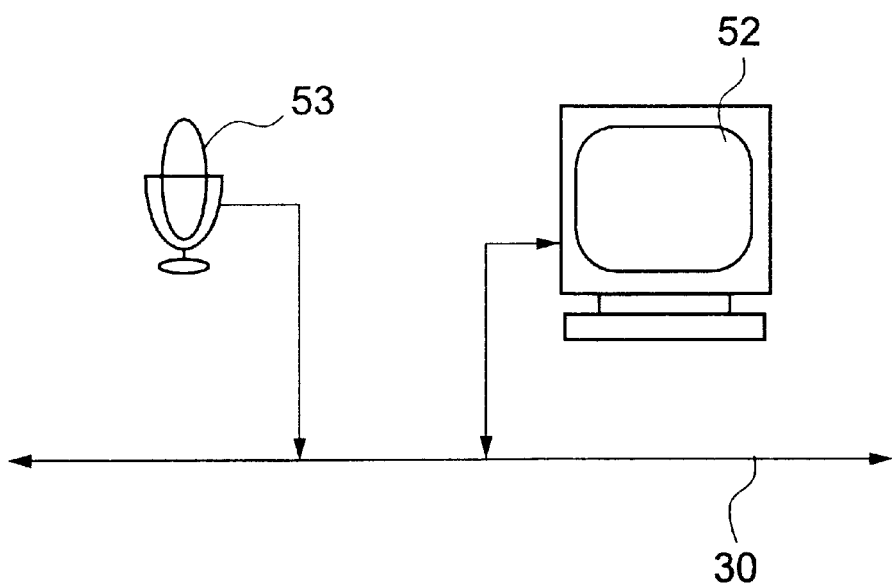
FIG. 7 is a diagram illustrating essential parts of a second and third modifications.

A touch screen 52, as shown in FIG. 7, may be substituted for the display unit 22 (a second modification). The touch screen 52 is connected to the bus 30 so as to be able to display a large amount of information. User IDs can be input by operations of ten keys and alphabetical characters displayed on the touch screen 52. The touch screen 52 may display thumb nail images of user's faces in the same manner as the server 12 as described above. A user can be specified by a thumb nail image displayed on the touch screen 52. The control unit 21 of the MFP 11 may have the same function as the sever terminal 12 so that processed document data can be archived and reused.

Figure 8A:
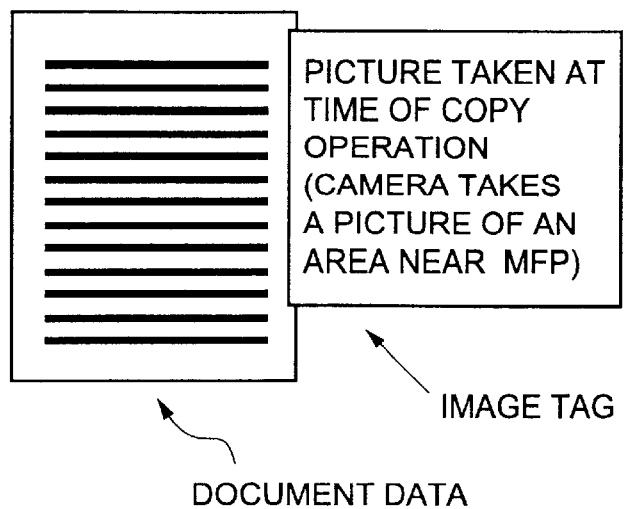
FIGS. 8A and 8B are diagram illustrating examples of an output format of information added to a document.
Figure 8B:
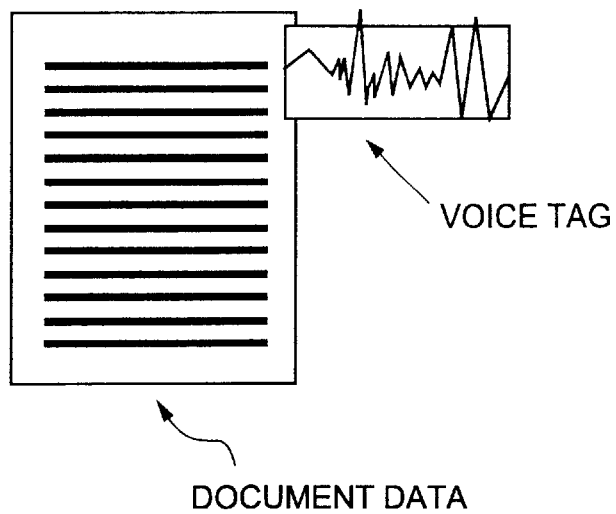
Figure 10:
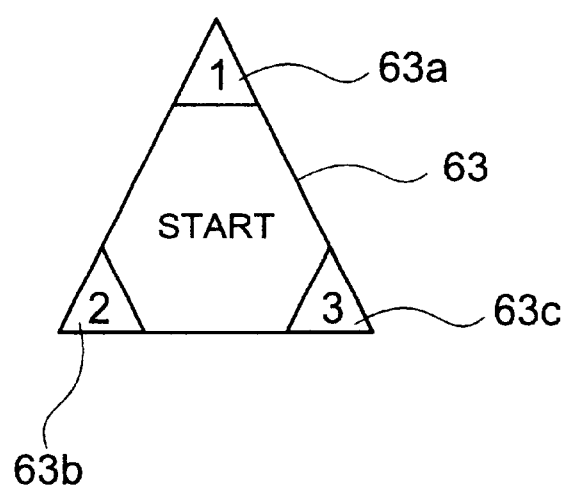
FIG. 10 is a diagram illustrating an essential part of the file system according to a second embodiment of the present invention.

A microphone 53 may be connected to the bus 30 as shown in FIG. 7 (a third modification). In this case, when the start key 23c is depressed, sounds based on operating environment of the MFP 11 and voices, about a type of an original to be processed, of a user operating the MFP 11 are recorded through the microphone 53. Audio data corresponding to the recorded sounds and/or voices are added to the document data as the additional data as shown in FIG. 8B. A picture of operating environment of the MFP 11 may be added to the document data as shown in FIG. 8A. In addition, in a case where a picture or voices of a user can be detected, a unit 54 which compares the detected picture or voices with reference data which is previously formed in the voice processing or the image processing. It is determined whether the detected picture or voices are that of the user. The operator can be recognized based on the determination result. A user ID can be then identified based on the recognition result.

A description will now be given of the file system according to a second embodiment of the present invention. In the second embodiment, the constitution of the file system similar to that in the first embodiment. The drawings showing the system of the first embodiment are used for description of the second embodiment.

In the second embodiment, a start key 63 is substituted for the start key 23c shown in FIG. 3. The start key 63 is provided in the operation unit 23. The start key 63 is triangularly shaped. Contact points are formed at the center and three corner portions of the start key 63. A first corner portion 63a, a second corner portion 63b and a third corner portion 63c correspond to operation modes. In response to depressing the first corner portion 63a of the start key 63, the control unit 21 executes the processes for a specified function and filing document data (the back-up of the document data). In response to depressing the second corner portion 63b of the start key 63, the control unit 21 executes only the process for filing document data. In response to depressing the third corner portion 63c of the start key 63, the control unit 21 executes only the process for a specified function. After one of the operation modes is selected by depressing a corresponding one of the three corner portions 63a, 63b and 63c of the start key 63, the center of the start key 63 in depressed. Then, the process(es) in the selected operation mode starts. An LED (Light Emitting Diode) are provided in each of the three corner portions 63a, 63b and 63c of the start key 63. When one of the three corner portions 63a, 63b and 63c is depressed, an LED in the depressed corner portion of the start key 63 is turned on. When it is determined, in step S9 or S10 shown in FIG. 5, that the process(es) has been completed, the LED in the corner portion corresponding to the completed process(es) is turned off and the LED in the first corner portion 63a is turned on as the default condition.

According to the second embodiment, further, a mode in which only the process for filing document data (the back-up of the document data) is executed and a mode in which only the process for a selected function is executed are selectable. Document data which should be used only as back-up data can be archived in the same manner as in a case of a normal file system. In addition, the third corner portion 63d can be used as the "undo" key. Thus, the function corresponding to the "undo" key described in the first embodiment can be implemented by the start key 63. Thus, a number of keys arranged in the operation unit 23 is not increased. In addition, sine the mode corresponding to the first corner 63a of the start key 63 is selected as the default condition, the process in the mode corresponding to the first corner 63a of the start key 63 can be executed by only depressing the center of the start key 63.

The control unit 21 may select the mode In which only the process for filing document data (corresponding to the second corner portion 63b of the start key 63) is executed when a key "0" out of the ten keys 23c is depressed (a fourth modification). The key 63b may be designed to select the mode in which the process of filing a document is carried out after encryption mode. The encryption method and/or parameters may be given in corresponding to user IDs. The encryption may be processed in the image processing unit 29. After this process, the encrypted document is transmitted to the server 12. In this case, the security of the document data can be improved because the document has been already encrypted even on the transmission line between the MFP 11 and the server 12. Also, when this mode (the encryption and filing mode) is selected, it is natural that the MFP 11 requests a user ID (the authentication of the user) to the operator if the authentication has not yet done.

A description will now be given of the file system according to a third embodiment of the present invention. In the third embodiment, the constitution of the file system is similar to that in the above embodiment. The drawings showing the system of the above embodiment are used for description of the third embodiment.

Figure 11:
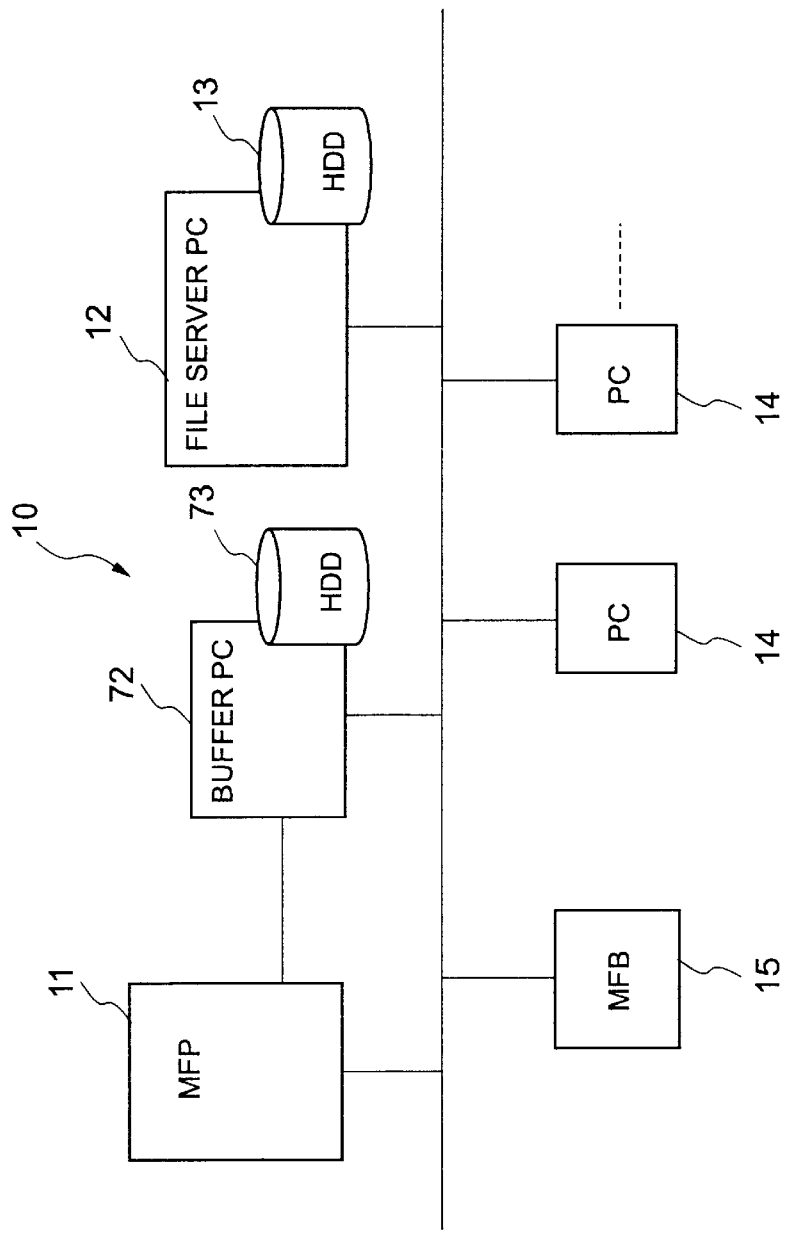
FIG. 11 is a block diagram illustrating the file system according to a third embodiment of the present invention.

Referring to FIG. 11, the system 10 according to the third embodiment has the MFP 11, the server 12, the IMS unit 13, the PCs 14, the MFB 15, a buffer unit 72 and a mass storage unit 73. The buffer unit 72 has the same constitution as the server 12 and each of the PCs 14. The buffer unit 72 receives document data and additional data, both of which should be supplied to the server 12, directly from the MFP 11 not via the intranet. The document data and the additional data are stored in the mass storage unit 73. The document data is then read out from the mass storage unit 73 and transmitted to the server 12 via the intranet. After the transmission of the document data is completed, the document data is deleted from the mass storage unit 73. The buffer unit 72 may be provided in the MFP 11.

In the present embodiment, the document data from the MFP 11 is directly received by the buffer unit 72 and then transmitted to the server 12. In a case where the MFB 15 is out of order, so that the intranet can not be used, and/or in a case where the server 12 is out of order, so that the document data can not be received, the document data processed by the MFP 11 can be stored in the buffer unit 72. In addition, since the document data stored in the mass storage unit 73 via the buffer unit 72 after the transmission of the document data to the server 12 is completed, the document data is prevented from disappearing in the intranet. Thus, the document data and the additional data can be certainly archived and the document data is prevented from disappearing without noticing by the user. As a result, the reliability of the system can be improved.

In the recent years, a copy machine which can be carry out a high speed copy operation by which A4 sized copy prints can be obtained at a rate of 30/min has been proposed. In a case where MFP 11 has a copy function having such a high speed operation, It is necessary for the server 12 connected to the MFP 11 to carry out an OCR process for image data at a rate of 8M pixels/second. Thus, the server 12 is very expensive. However, according to the present embodiment, since the buffer unit 72 receives the document data transmitted from the MFP 11 at a high speed before the document data is supplied to the server 12, the server 12 can process the document data supplied from the buffer unit 72 at a speed which is not so high.

A description will now be given, with reference to FIGS. 12 and 13, of a fourth embodiment of the present invention. In the fourth embodiment, the constitution of the file system is similar to that in the above embodiment. The drawings showing the system of the above embodiment are used for the description of the fourth embodiment.

Figure 12:
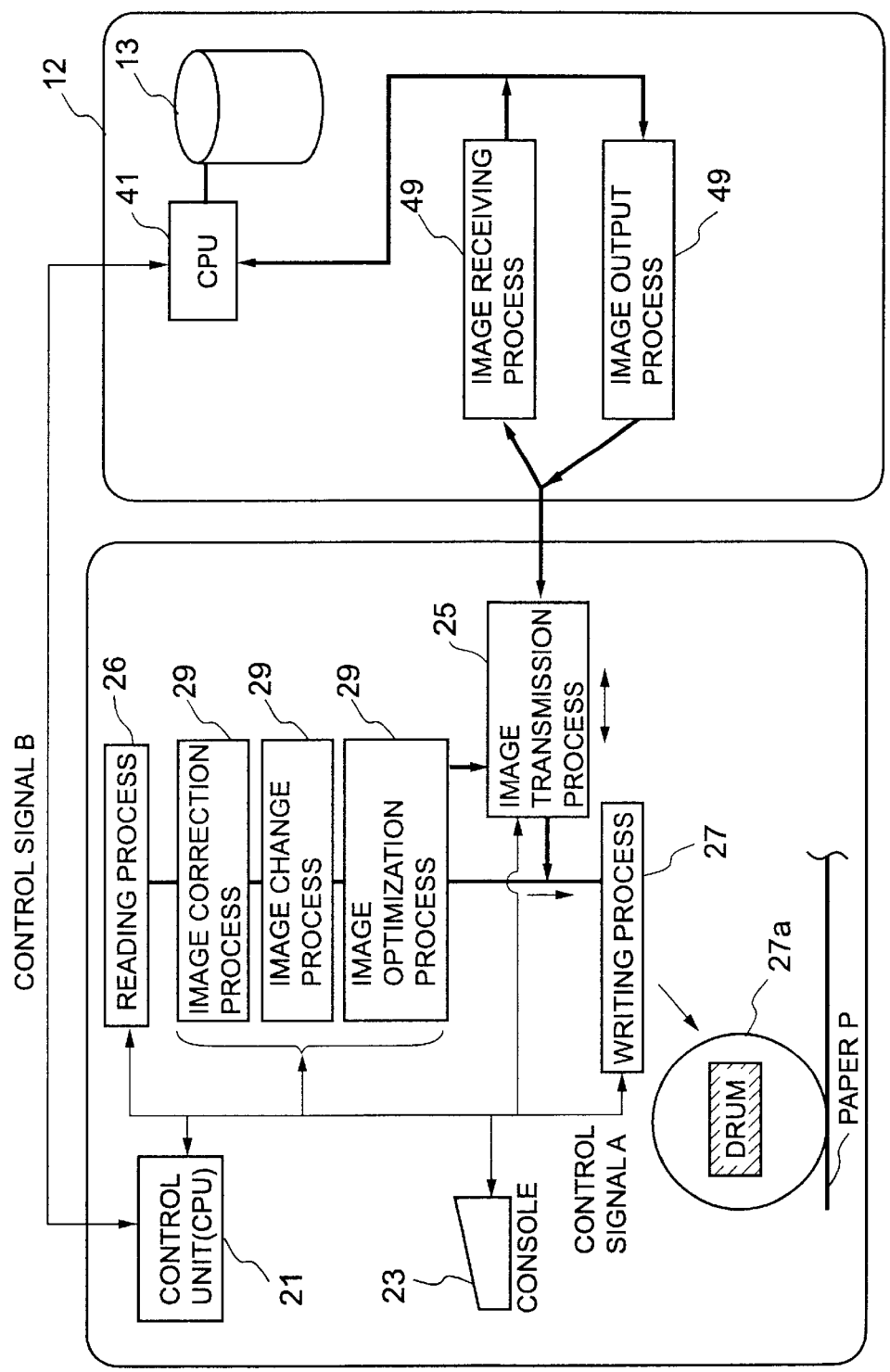
FIG. 12 is a block diagram illustrating the file system according to a fourth embodiment of the present invention.
Figure 13:
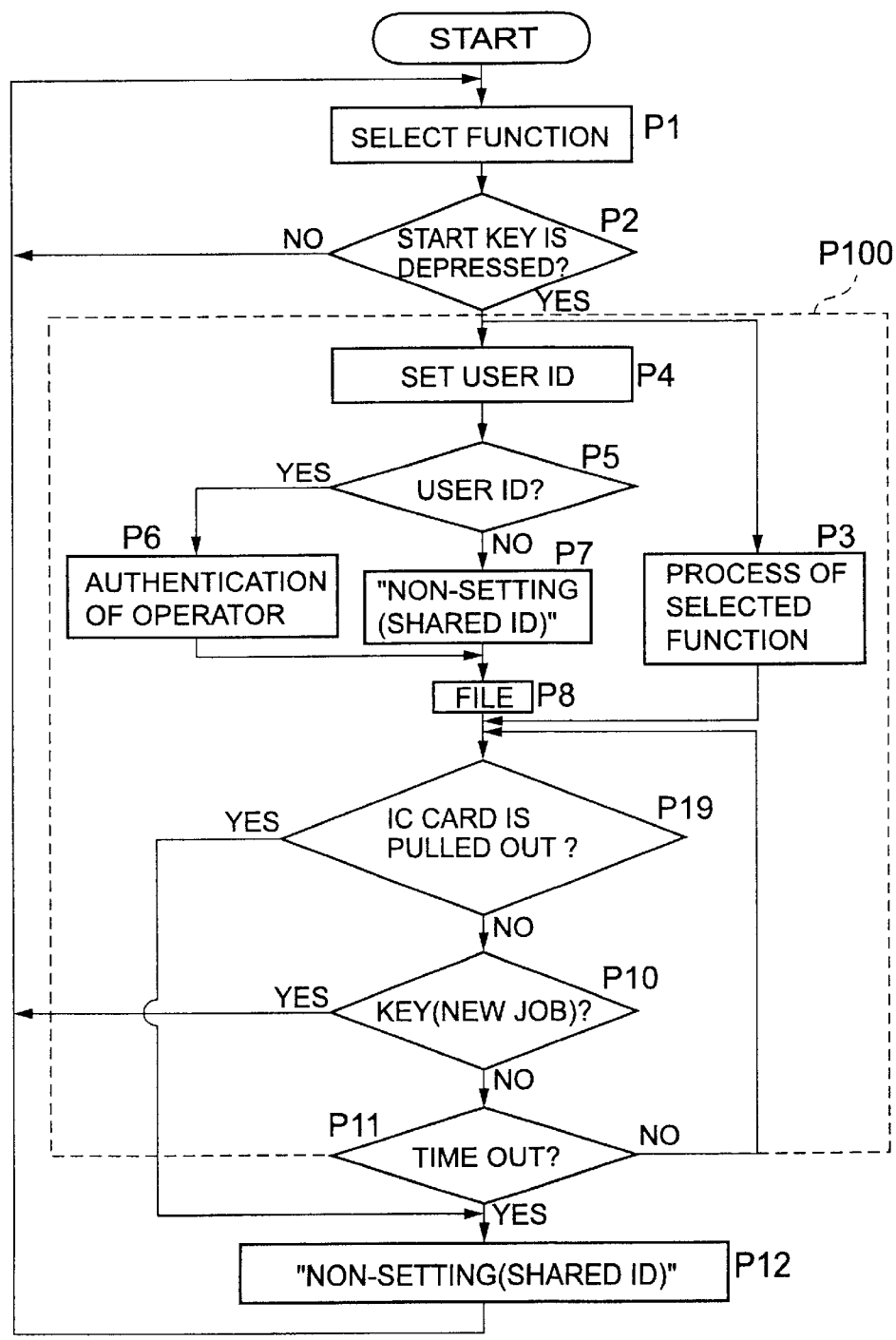
FIG. 13 is a flowchart illustrating a procedure of a process executed in the file system shown in FIG. 12.

Referring to FIG. 12, the MFP 11 and the server 2 are coupled to each other. The MFP 11 carries out the file process in the same procedure as that in the case shown in FIG. 5. For example, when the start key 23c on the operation unit 23 is depressed without operation of any function key to select the copy function (steps P1 and. P2), the copy operation in which images of an original set on the reading unit 26 is read by the reading unit 26 and copied (step P3) starts. During the copy operation, if the IC card is set in the operation unit 23, an operator of the MFP 11 is authenticated based on the user ID read out from the IC card (steps P4 and P5). On the other hand, if a user ID is not received, the shared ID read out from the nonvolatile RAM of the control unit 21 is set as a user ID so that the authentication of the user is set in the "non setting" state (steps P4, P5 and P7).

In the MPF terminal 11, the image processing unit 29 applies image correction processes, the image change process, such as the magnification/reduction process, and the optimization process to the document data obtained by the reading unit 26. After this, the recording unit 27 optically writes the document data on the photosensitive drum 27a so that the copy operation is carried out in accordance with the electrophotographic process (steps P3). During the copy operation, document data which the same as the document data obtained in the optimization process is coded and compressed by the image processing unit 29 and the coded document data is transmitted to the server 12 together with the user ID and a control signal A indicating a copying condition via the communication control unit 25 to store the document data in the IMS unit 13 (step P8). The copying condition includes attribute information of an image which information should be added to the document data, such as sizes of the original and the recording paper, the number of copies, the user's name, a processing time, finisher information (e.g., a staple and/or sorting processes) and a description language if in the case of character data from the PC 14.

Thus, the document data which is the same as the document data obtained Just before being processed by the recording unit 27 is automatically archived by the server 12 together with the additional data without a specific operation for the back-up of the document data (archiving). In the server 12, the document data to be archived is supplied to and stored in the IMS unit 13 via the I/F 49 so as to correspond to the user ID. In addition, when the document data is processed under a condition in which a user ID is not received, the shared ID is used and the processed document data is archived in the same manner as that in the above case using the user ID.

In the MFP 11, when the IC card is pulled out of the operation unit 23, it is determined that the process requested by the user has been completed (step P19). In addition, when it is determined, based on a period of measured by a timer (not shown), that a predetermined time has elapsed from a time at which the reading operation for the original set on the reading unit 26 was completed, the process requested by the user has been completed (step P11). In one of the above cases, the user ID identifying the operator (the user) is cleared. In the case where a user ID is not received, the shared ID is used and the authentication of the user is set in the "non-setting" state, so that the use of the same user ID between different users is prevented (step P12). When another key, such as a function key and/or the start key 23c, is operated to input an start instruction for a new job before it is determined in step P11 that the predetermined time has elapsed and determined in step P19 that the IC card is pulled out (step P10), the process returns to step P1 under a condition in which the same user ID is maintained.

Thus, in the present embodiment, the change of the user operating the MFP 11 can be certainly detected. The user ID accurately corresponding to the user can be added to the document data. When the "undo" key on the operation unit 23 is depressed within the steps P2–P11 (step P100), the archived document data is deleted.

In the server 12, the CPU 41 receives the additional data, specifying the document data, such as the additional remark information (e.g., the title), key words in the document and the number of times which the document is reused. The additional data for each user ID is stored in the data base in the hard disk unit 43 together with addresses corresponding to document data items stored in the IMS unit 13 or the Web-IMS unit 13. When a menu item for a reference request of document data processed in the MFP 11 is selected on the screen of the display unit 44, a list of additional data Items or thumb nail images corresponding to document data items corresponding to a user ID is displayed on the screen. An additional data item or a thumb nail image is selected from the list by using the mouse. Document data items corresponding to the selected additional data item or thumb nail image are read out from the IMS unit 13. The document data items read out from the IMS unit 13 are decoded by the image processing unit 29 and images corresponding to the document data items are displayed by the display unit 44. That is, the document data items can be retrieved. When the server 12 receives an instruction for reusing a document data item, the server 12 transmits the document data item and the additional data to the MFP 11 via the I/F 49. At this time, the server 12 communicates with the MFP 11 using a control signal B for sequentially controlling the control unit 21 of the MFP 11 in accordance with a communication procedure. In the communication between the MFP 11 and the server 12, after the communication control unit 25 receives the document data and the additional data, the document data and the additional data is directly supplied from the communication control unit 25 to the recording unit 27. The recording unit 27 is then controlled to be driven so that prints of the document data are output under the same condition as in the copy process in step P3. The recording unit 27 may carry out the printing operation in accordance with not only the electrophotographic process, but also the thermal transferring process or the ink jet printing process. In the printing operation in accordance with any of the above processes, a writing point scans on a line in a main scanning direction while the scanning line is being moved step by step in a sub scanning direction perpendicular to the main scanning direction. The receiving and transmitting processes in the I/F 49 may be carried out in the same way as the printing process in the selected function in the MPF terminal 11 and data transmission to the server 12 by the communication control unit 25. Thus, the I/F 49 has the same hardware constitution for the receiving and transmitting processes as those for the printing process in the selected function in the MPF terminal 11 and the data transmission to the sever terminal 12 by the communication control unit 25 (including a case of the data transmission to another unit by a modem provided in the communication control unit 25).

The MFP 11 can make a print based on document data generated by the PC 14. The document data can be processed in the same way as the above image data. The back-up of image data transmitted by using the facsimile function can be set in either a condition in which the image data can be retransmitted or a condition in which the image data can be printed out. In a case where the back-up of the image data is set in the condition in which the image data can be retransmitted, in the same way as the case of the back-up of the data in the copy function, document data applied with the image correction process, the image change process and the image optimization process by the image processing unit 29 after the reading process by the reading unit 26 is coded and compressed. The coded (compressed) document data is transmitted to the server 12 and stored in the IMS unit 13 so as to corresponding to the additional data, such as a telephone number of a destination. When a reprocessing instruction is input, the document data and the additional data transmitted to the MFP 11 via the I/F 49. After the document data and the additional data is received by the communication control unit 25, the document data can be retransmitted under the same condition as that which was transmitted in the facsimile communication while back-up of the data was being carried out. In addition, in a case where the back-up of the image data is set in the condition in which the image data can be retransmitted, in the same way as the case of the back-up of the data in the copy function, document data applied with the image correction process, the image change process and the image optimization process by the image processing unit 29 after the reading process by the reading unit 26 shown in FIG. 12 is coded and compressed in the same way as in the printing process for received image data. When a reprocessing instruction is input, the document data and the additional data is supplied to the printing unit 27 via the I/F 49. The printing unit 27 makes a print having an image corresponding to the received image data.

Thus, a desired document data item selected from among the document data items stored in the IMS unit 13 or the Web-IMS unit 16 based on the additional data or the thumb nail image is printed out on a paper or retransmitted under a processing condition described in the additional data. In this case, the document data to be supplied to the recording unit 27 or the communication control unit 25 is captured in the image processing unit 29 and stored in the IMS unit 13 or the Web-IMS unit 16. When the document data reused, the document data read out from the IMS unit 13 or the Web-IMS unit 16 is directly output to the recording unit 27 or the communication control unit 25 together with the additional data including the processing condition. As a result, the document data can be reused with neither a specific operation for inputting the processing condition nor repeating the same processing procedure. A desired document having the same format as the document which was processed by the selected function in the MFP 11 can be rapidly reprinted and retransmitted. Thus, the usability of the file system can be improved.

In addition, the document data which was transmitted in the facsimile communication can be backed up under the condition in which the document data can be retransmitted or the condition in which the document data can be printed. Thus, the document data can be reused in accordance with a manner desired by the user.

In addition, in a fifth modification, the MFP 11 may be directly connected to the server 12 and the server 12 may be provided in the MFP 11. In addition, the MFP 11 may be directly connected with the buffer unit which relays the data to the server 12. In this case, the document data from the MFP 11 is directly in the IMS unit 13 without passing through the intranet. Thus, even if the MFB 15 and/or the server 12 are out of order, the document data is prevented from disappearing in the intranet, so that the document data can be archived as the back-up. In view of the limitation of a space on which the system is installed, it is preferable that the MFP 11 be connected to the server 12 by the intranet. In this case, if the buffer unit is directly connected to the MFP 11, the reliability of the system can be improved.

In a sixth modification, a user ID can be input after input another user ID. In a case where plurality of user IDs are added to the document data as the additional data, an address of the document data and other data items including the additional data for every user ID are stored in the database formed in the hard disk unit 43. Shared documents for conferences or circulation may be reused by users using the respective user IDs.

In a seventh modification, a "document segmentation" key may be provided on the operation unit 23. In a case where a plurality of original documents are processed, document data can be transmitted to the server 12 document by document by depressing operations of the "document segmentation" key. The document data items can be stored in the IMS unit 13 or the Web-IMS unit 16 document by document. The document data for each document can be reused.

In the above embodiments, a user ID identifies a single user. However, a user ID may identify a group of users, such as a post.

The present invention is not limited to the aforementioned embodiments, and other variations and modifications may be made without departing from the scope of the claimed invention.

The present application is based on Japanese priority application Nos. 9-291451 filed on Oct. 24, 1997, 9-301364 filed on Nov. 4, 1997 and 10-200902 filed on Jul. 15, 1998, the entire contents of which are hereby incorporated by reference.

What is claimed is:

1. A file system in which a processing apparatus is coupled to a storage unit, the processing apparatus having a copy function for reading image data from a document and printing the read image data on a sheet using an electrophotographic recording process, a transmitting function for transmitting image data and/or character data via a communication line and a printing function for printing received image data and/or character data on a sheet, said file system comprising:

storage management means for automatically causing said storage unit to archive data equal to processed data corresponding to a processing result obtained by each one of the functions provided in said processing apparatus; and output management means for outputting the data read from said storage unit in response to a processing instruction supplied to the file system, wherein said storage management means has information obtaining means for obtaining specifying information corresponding to data to be archived by said storage unit so that the specifying information is added to the data to be archived by said storage unit, and wherein said output management means has display means for displaying either at least a part of each of data items archived by said storage unit or specifying information items specifying the data items, and operation means for selecting an item from among the items displayed by said display means and inputting the processing instruction, so that a data item corresponding to the selected item is output in response to the input processing instruction.

2. The file system as claimed in claim 1, wherein said information obtaining means obtains, as the specifying information, at least one of a time at which the data is stored, a key word extracted from the data, additional remark information added to the data, a number of times which the data is output by said output management means, information about an operator of said data processing apparatus and a processing condition of a process in said data processing apparatus.

3. The file system as claimed in claim 2, wherein said storage management means causes said storage unit to store a data item to which the information about the operator is added as the specifying data under a condition in which the data item and the information about the operator correspond to each other and causes said storage unit to store a data item to which the information about the operator is not added under a condition in which the operator for the data item is not specified.

4. The file system as claimed in claim 3, wherein said information obtaining means determines whether an operator carrying out an input operation in said processing apparatus differs from an operator who previously carried out the input operation, and wherein said storage management means causes the storage unit to store a data item under a condition in which an operator for the data item is not specified unless said information obtaining means obtains information about the operator.

5. The file system as claimed in claim 2, wherein said output management means has retrieving means for retrieving data items specified by specifying information items satisfying a condition from data items stored in the storage unit, wherein said retrieving means retrieves data items specified by specifying information items, each of the specifying information items including a time a which a corresponding data item was stored, the time being within a term input by said operation means, and wherein either at least a part of each of the retrieved data items or specifying information items specifying the retrieved data are indicated by said display means.

6. The file system as claimed in claim 1, wherein said output management means has retrieving means for retrieving data items specified by specifying information items satisfying a condition from data items stored in the storage unit, wherein said retrieving means retrieves data items specified by specifying information items input by said operation means, and wherein either at least a part of each of the retrieved data items or specifying information items specifying the retrieved data are indicated by said display means.

7. A computer readable storage medium storing a program causing a computer to execute a process for a file system in which a processing apparatus is coupled to a storage unit, said processing apparatus having a copy function for reading image data from a document and printing the read image data on a sheet using an electrophotographic recording process, a transmitting function for transmitting image data and/or character data via a communication line and a printing function for printing received image data and/or character data on a sheet, said program comprising a first procedure and a second procedure, wherein said first procedure automatically causes said storage unit to archive data equal to processed data corresponding to a processing result obtained by each one of the functions provided in said processing apparatus, specifying information corresponding to the data being added to the data, and said second procedure causes a display unit to display either at least a part of each of data items archived in said storage unit or specifying information items specifying the data items and outputs a data item specified by an item selected by an operation unit from the items displayed by said display unit in response to a processing instruction input by said operation unit.

8. The computer readable storage medium as claimed in claim 7, wherein said program comprises at least one of a first step and a second step, said first step storing data items specified by information items about operators of said processing apparatus which are obtained as the specifying information so that the data items and the information items about the operators correspond to each other, said second step reading out data items identified by a information item about an operator and causing said display unit to display the read data items.

9. The computer readable storage medium as claimed in claim 7, wherein said program comprises at least one of a third step and a fourth step, said third step storing data items specified by times at which the data items are stored, the times being obtained as the specified information, so that the times and the data items correspond to each other, said fourth step reading out data items specified by times within a term input and causing said display unit to display the read data items.

10. The computer readable storage medium as claimed in claim 7, wherein said program comprises a fifth step for reading data items specified by specifying information items satisfying a condition and causing said display unit to display the read data items.

11. A file system in which a processing apparatus is coupled to a storage unit, said processing apparatus having a copy function for reading image data from a document and printing the read image data on a sheet using an electrophotographic recording process, a transmitting function for transmitting image data and/or character data via a communication line and a printing function for printing received image data and/or character data on a sheet, said file system comprising:

storage management means for causing said storage unit to archive data equal to processed data corresponding to a processing result obtained by processing data in accordance with each one of functions provided in said processing apparatus; and output management means for outputting data read out from said storage unit in response to a processing instruction, wherein said storage management means captures processed data obtained before printing in the copy function or the printing function and causing said storage unit to archive the captured data, and wherein said output management means applies the data read out from said storage unit to the function which was used to process the data in said processing apparatus.

12. The file system as claimed in claim 11, wherein said storage management means captures processed data obtained in a function other than the copy function and the printing function and changes the processed data to data which can be printed in said printing function, the changed data being stored in said storage unit.

13. The file system as claimed in claim 11, wherein said storage management means captures processed data obtained in a function other than the copy function and the printing function and causes said storage unit to store the processed data.

14. A computer readable storage medium storing a program causing a computer to execute a process for a file system in which a processing apparatus is coupled to a storage unit, said processing apparatus having a copy function for reading image data from a document and printing the read image data on a sheet using an electrophotographic recording process, a transmitting function for transmitting image data and/or character data via a communication line and a printing function for printing received image data and/or character data on a sheet, said program comprising a first procedure and a second procedure, wherein said first procedure captures processed data obtained by processing data in accordance with each one of the functions provided in said processing apparatus, captures processed data obtained before printing in the copy function or the printing function and causes said storage unit to archive the captured data, and wherein said second procedure applies the data read out from said storage unit in accordance with a processing instruction to the function which was used to process the data in said processing apparatus.

15. The computer readable storage medium as claimed in claim 14, wherein said first procedure has a step for capturing processed data obtained in a function other than the Copy function and the printing function and changing the processed data to data which can be printed in said printing function, the changed data being stored in said storage unit.

16. The computer readable storage medium as claimed in claim 14, wherein said first procedure has a step for capturing processed data obtained in a function other than the copy function and the printing function and causing said storage unit to store the processed data.

17. The file system as claimed in claim 11, wherein said storage management means automatically causes said storage unit to store the data equal to processed the data corresponding to a processing result obtained by the function provided in said processing apparatus.

18. The computer readable storage medium as claimed in claim 14, wherein said first procedure automatically captures processed data obtained before printing in the copy function or the printing function and causing said storage unit to store the captured data.

19. The file system as claimed in claim 1, wherein said storage management means cancels storing the data in said storage unit when a predetermined instruction is supplied.

20. The file system as claimed in claim 11, wherein said storage management means cancels storing the data in said storage unit when a predetermined instruction is supplied.

21. The computer readable storage medium as claimed in claim 7, wherein said first procedure has a step for canceling storing the data in said storage unit when a predetermined instruction is supplied.

22. The computer readable storage medium as claimed in claim 14, wherein said first procedure has a step for canceling storing the data in said storage unit when a predetermined instruction is supplied.

* * * * *